(12) United States Patent
Guo (10) Patent No.: US 8,808,435 B2
(45) Date of Patent: Aug. 19, 2014

(54) ADSORPTION-SEPARATION DEVICE

(75) Inventor: Yinghui Guo, Shenzhen (CN)

(73) Assignee: Shenzhen Biteman Science & Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/821,108

(22) PCT Filed: Sep. 1, 2011

(86) PCT No.: PCT/CN2011/079225
§ 371 (c)(1),
(2), (4) Date: Mar. 6, 2013

(87) PCT Pub. No.: WO2012/031532
PCT Pub. Date: Mar. 15, 2012

(65) Prior Publication Data
US 2013/0167726 A1    Jul. 4, 2013

(30) Foreign Application Priority Data
Sep. 8, 2010  (CN) .......................... 2010 2 0521796

(51) Int. Cl.
*B01D 53/02*    (2006.01)
(52) U.S. Cl.
USPC .................. 96/133; 96/134; 96/149; 96/151; 210/264; 210/282; 210/290; 55/475; 55/484; 55/516; 55/518
(58) Field of Classification Search
USPC ........... 55/179, 316, 387, 475, 484, 516, 518; 210/264, 282, 290; 96/133, 134, 149, 96/151
See application file for complete search history.

(56) References Cited

U.S. PATENT DOCUMENTS

| | | | | | |
|---|---|---|---|---|---|
| 4,673,420 | A | * | 6/1987 | Haker et al. | .................... 96/118 |
| 5,403,387 | A | * | 4/1995 | Flynn et al. | .................... 96/143 |
| 5,681,370 | A | * | 10/1997 | McMahon | .................... 95/105 |
| 5,779,772 | A | * | 7/1998 | Unger et al. | .................... 96/137 |
| 6,692,556 | B2 | * | 2/2004 | Hayes et al. | .................... 96/147 |
| 2009/0199522 | A1 | * | 8/2009 | Hilberer | .................... 55/385.1 |

FOREIGN PATENT DOCUMENTS

| | | |
|---|---|---|
| CN | 2873293 | 2/2007 |
| CN | 200955894 | 10/2007 |
| CN | 201783284 | 4/2011 |
| EP | 1238695 | 9/2002 |
| JP | 7-108125 | 4/1995 |
| JP | 2003-047822 | 2/2003 |

* cited by examiner

*Primary Examiner* — Christopher P Jones
(74) *Attorney, Agent, or Firm* — Hamre, Schumann, Mueller & Larson, P.C.

(57) ABSTRACT

The present invention relates to the field of adsorption-separation technology, and more particularly, to an adsorption-separation device. The device includes a base component, a top cover component and adsorption pipes arranged between the base component and the top cover component. One end of the adsorption pipe is detachably connected with the base component and, the other end of the adsorption pipe is detachably connected with the top cover component, a locking component used for compressing the adsorption pipes is arranged between the base component and the top cover component. The adsorption pipes are detachably inserted between the base component and the top cover component, the base component and the top cover component 200 are connected by the locking component to be convenient for assembly and disassembly. Therefore the adsorption-separation device can be assembled and disassembled quickly, the adsorption pipes can be easily replaced, and the low cost maintenance and the stable reliably of the device are achieved.

9 Claims, 11 Drawing Sheets

ADSORPTION-SEPARATION DEVICE

BACKGROUND OF THE INVENTION

1. Technical Field

The present invention relates to the field of adsorption-separation technology, and more particularly, to an adsorption-separation device.

2. Description of Related Art

At present, all of the adsorption pipes in the known adsorption-separation devices can't be disassembled, and most of the adsorption pipes are integratedly formed, which makes it impossible to replace the adsorption pipes or adsorption materials therein by users. During the replacement of the adsorption materials, special tools are needed to suck original waste materials out from the adsorption-separation device. When new adsorption materials are filled, the filling operation is also only performed on the adsorption-separation device. Not only the operations are very inconvenient, but also adsorption performance of the adsorption-separation device is reduced due to the loose fill. Furthermore, maintenance costs of the adsorption-separation device will be increased and the continuous operation performance will be affected.

BRIEF SUMMARY OF THE INVENTION

A technical problem to be solved by the present invention is to overcome the shortcomings of the prior art and provide an adsorption-separation device convenient for users to replace adsorption pipes and fill adsorption materials quickly.

The present invention adopts the following technical solutions to solve the technical problem:

An adsorption-separation device including a base component, a top cover component and adsorption pipes arranged between the base component and the top cover component is provided. One end of the adsorption pipe is detachably connected with the base component, the other end of the adsorption pipe is detachably connected with the top cover component, and a locking component used for compressing the adsorption pipes is arranged between the base component and the top cover component.

In particular, the locking component is extended through the base component and the top cover component, the locking component is a screw bolt.

In particular, the base component defines annular grooves therein for engaging with the adsorption pipes.

In particular, the top cover component defines recesses therein for engaging with the adsorption pipes.

In particular, there are at least two adsorption pipes, a limiting plate is arranged around the adsorption pipes for engaging with the limiting plate, and the limiting plate is arranged below the top cover component.

In particular, the base component includes a base and a lower air pipe arranged between the base and the adsorption pipes, the top cover component includes a top cover and an upper air pipe arranged between the top cover and the adsorption pipes, one end of the adsorption pipe is connected with the lower air pipe, the other end of the adsorption pipe is connected with the upper air pipe, the lower air pipe is connected with an air inlet valve and the upper air pipe is connected with an air outlet valve.

More particularly, the air inlet valve includes a first valve seat having a first pipe joint holder and air inlets, first controlling valves are provided at the air inlets to open or close the air inlets, a first controlling air cylinder is fixedly arranged at the air outlet valve, the air outlet valve includes a second valve seat having a second pipe joint holder and air outlets, one-way valves used for opening or closing the air outlets are arranged at the air outlets, and an air regeneration valve is arranged on the upper air pipe.

Furthermore, the lower air pipes are connected with air exhaust silencing valves fixedly arranged on the lower air pipes, the air exhaust silencing valve includes a silencer and a second controlling cylinder fixedly arranged on the silencer.

Furthermore, a bypass pipe is provided between the air inlet valve and the air outlet valve, a bypass valve is fixedly arranged on the bypass pipe.

Furthermore, a heater is fixedly arranged within the top cover component.

In the present invention, an adsorption-separation device is provided, the adsorption pipes are detachably inserted between the base component and the top cover component, the base component and the top cover component are connected by the locking component convenient for assembly and disassembly, the adsorption materials can be replaced after adsorption pipes are removed without special tools. The replacement of the adsorption materials is easy to operate. The replacement of the adsorption materials after the adsorption pipes are removed is convenient to fill the adsorption materials tightly, which ensures the adsorption performance of the adsorption-separation device and is convenient for users to assemble and disassemble the adsorption-separation device quickly and to fill the adsorption materials. The adsorption-separation device has the advantages of low cost maintenance, remarkably reliable structure and good continuous operation performance.

DETAILED DESCRIPTION OF THE INVENTION

In order to make clearer the objects, technical solutions and advantages of the invention, the present invention will be explained below in detail with reference to the accompanying drawings and embodiments. It is to be understood that the following description of the embodiments is merely to explain the present invention and is no way intended to limit the invention.

As shown in FIGS. 1 to 4, an adsorption-separation device is provided, the adsorption-separation devices such as air dryers, nitrogen generators and oxygen generators are used for drying, separating and absorb air. The adsorption-separation device includes a base component 100, a top cover component 200 and adsorption pipes 300 arranged between the base component 100 and the top cover component 200. Adsorption materials are stored in the adsorption pipes 300. The base component 100 defines air inlet channels 101, the top cover component 200 defines air outlet channels 201, one end of the adsorption pipe 300 is detachably connected with the base component 100 and communicates with the air inlet channel 101, the other end of the adsorption pipe 300 is detachably connected with the top cover component 200 and communicates with the air outlet channel 201, and a locking component 400 used for compressing the adsorption pipes 300 is arranged between the base component 100 and the top cover component 200. Due to the design of the adsorption-separation device, during the replacement of the adsorption pipe, a user just needs to remove the locking component 400 so that the top cover component 200 can be removed and the adsorption pipes 300 can be drawn out quickly from the base component 100, then new adsorption pipes 300 may be inserted in the base component 100, the top cover component 200 is mounted on the adsorption pipes 300, at last, the top cover component 200 is locked by the locking component 400. The adsorption-separation device can be conveniently disassembled. During the replacement of the adsorption materials, the adsorption pipes 300 can be removed, and then the adsorption materials in the removed adsorption pipes 300 are replaced. Thus it is not necessary to replace the adsorption materials on the adsorption-separation device directly and use the special tools. The adsorption materials are easy to be replaced. After the adsorption pipes 300 are removed, the replacement of the adsorption materials is helpful to fill the adsorption materials tightly, which ensures the adsorption performance of the adsorption-separation device and is convenient for users to assemble and disassemble the adsorption-separation device quickly and to fill the adsorption materials. The adsorption-separation device has the advantages of low cost maintenance, remarkably reliable structure and good continuous operation performance.

Figure 3:
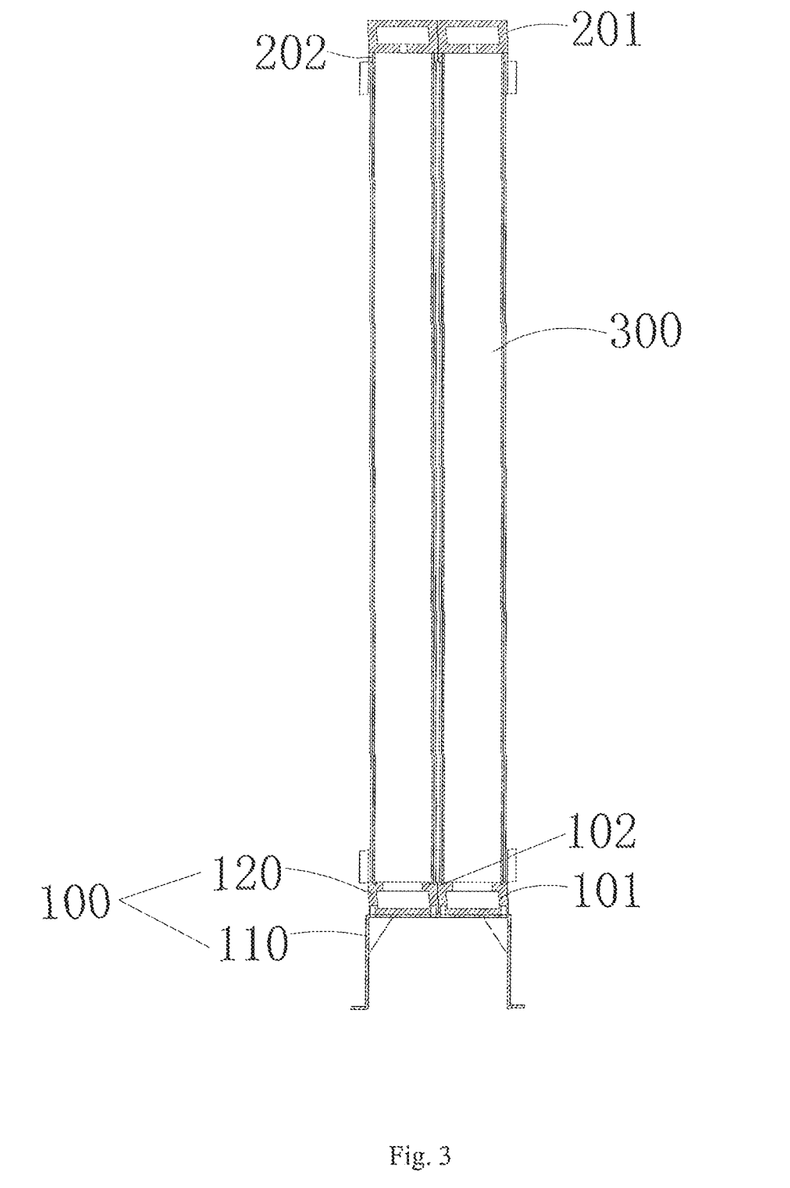
FIG. 3 is a schematic sectional view of the adsorption-separation device according to the embodiment of the present invention.
Figure 4:
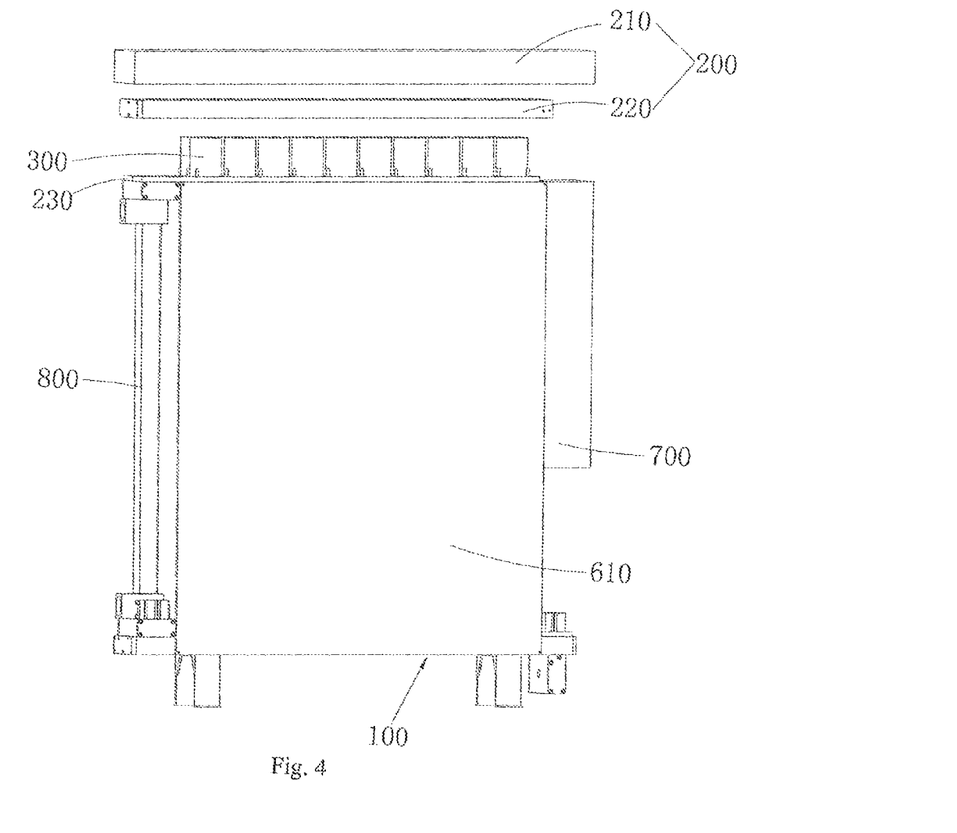
FIG. 4 is a schematic perspective exploded view of the adsorption-separation device according to the embodiment of the present invention.

In particular, as shown in FIG. 3 and FIG. 4, the base component 100 includes a base 110 and lower air pipes 120 arranged between the base 110 and the adsorption pipes 300. The air inlet channel 101 is defined in the lower air pipe 120. The top cover component 200 includes a top cover 210 and upper air pipes 220 arranged between the top cover 210 and the adsorption pipes 300. The air outlet channel 201 is defined in the upper air pipe 220. One end of the adsorption pipe 300 is connected with the lower air pipe 120, and the other end of the adsorption pipe 300 is connected with the upper air pipe 220. The lower air pipe 120 is connected with an air inlet valve 510 and the upper air pipe 220 is connected with an air outlet valve 520 in order to connect to an air inlet hose and an air outlet hose respectively.

Furthermore, as shown in FIG. 3 and FIG. 4, a bypass pipe 800 is provided between the air inlet valve 510 and the air outlet valve 520. A bypass valve is arranged on the bypass pipe 800 which is in a closed state under normal condition. When high air pressure in the inside of the adsorption-separation device or the device failure occurs, the bypass pipe will be opened automatically by the action of the bypass valve, therefore after the air flows into the air inlet valve 510, the air will be outleted from the air outlet valve 520 through the bypass pipe 800. Thus the high reliability is achieved.

More particularly, as shown in FIG. 6 and FIG. 8 to FIG. 14, the air inlet valve 510 includes a first valve seat 511 having a first pipe joint holder 512 and air inlets 514 connected with the air inlet channel 101. In this embodiment, there are two air inlet channels 101. First controlling valves 513 driven by an air cylinder 515 are provided at the air inlets 514 to open or close the air inlets 514. A first controlling air cylinder is fixedly arranged at the air outlet valve 520 in order to control the air outlet valve 520. The air outlet valve 520 includes a second valve seat 521 including a second pipe joint holder 522 and air outlets 523 connected with the air outlet channel 201. Two air inlets 514 are connected with two different groups of adsorption pipes 300 respectively. By using the first controlling valves 513, the two group of adsorption pipes 300 work alternately, thereby, the filtering and drying effect are improved. One-way valves used for opening or closing the air outlets 523 are arranged at the air outlets 523, and an air regeneration valve (not shown) is arranged on the upper air pipe 220 and used for the outleted air flow, in order to improve the working efficiency of the device.

Furthermore, as shown in FIG. 3, FIG. 6, FIG. 15 and FIG. 16, the lower air pipe 120 is also connected with an air exhaust silencing valve 530 fixedly arranged on the lower air pipe 120. The air exhaust silencing valve 530 has an air outlet 531 and a silent joint 533. The air exhaust silencing valve 530 includes a silencer and a second controlling cylinder fixedly arranged on the silencer in order to reduce the noise generated during the discharge of the regeneration air.

Figure 1:
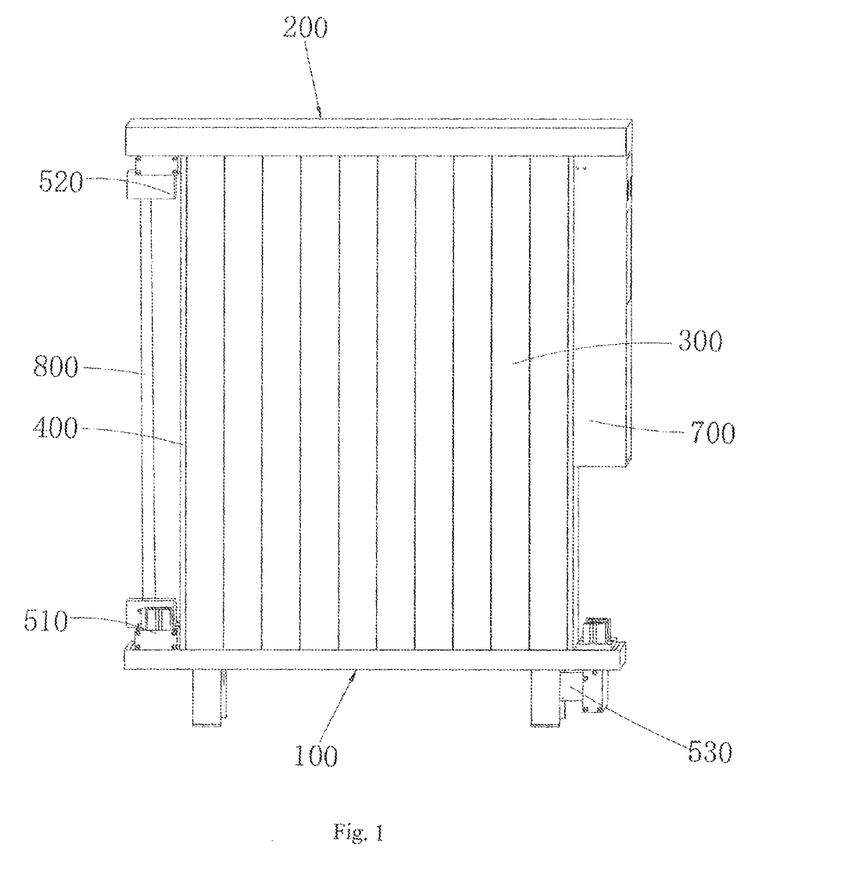
FIG. 1 is a perspective view of an assembled adsorption-separation device according to an embodiment of the present invention.
Figure 2:
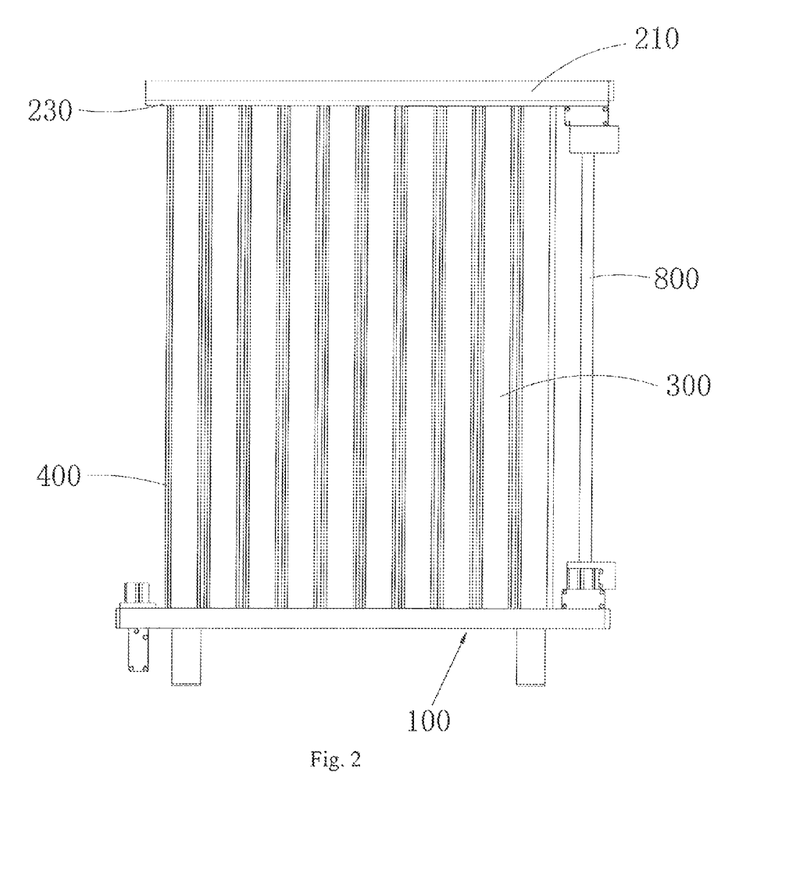
FIG. 2 is a schematic planar side view of the adsorption-separation device without a distribution box according to the embodiment of the present invention.

In particular, as shown in FIG. 1 and FIG. 2, the locking component 400 is extended through the base component 100 and the top cover component 200. The locking component 400 may be a screw bolt which is convenient for the assembly and disassembly of the device and make the device have remarkably reliable structure.

Figure 8:
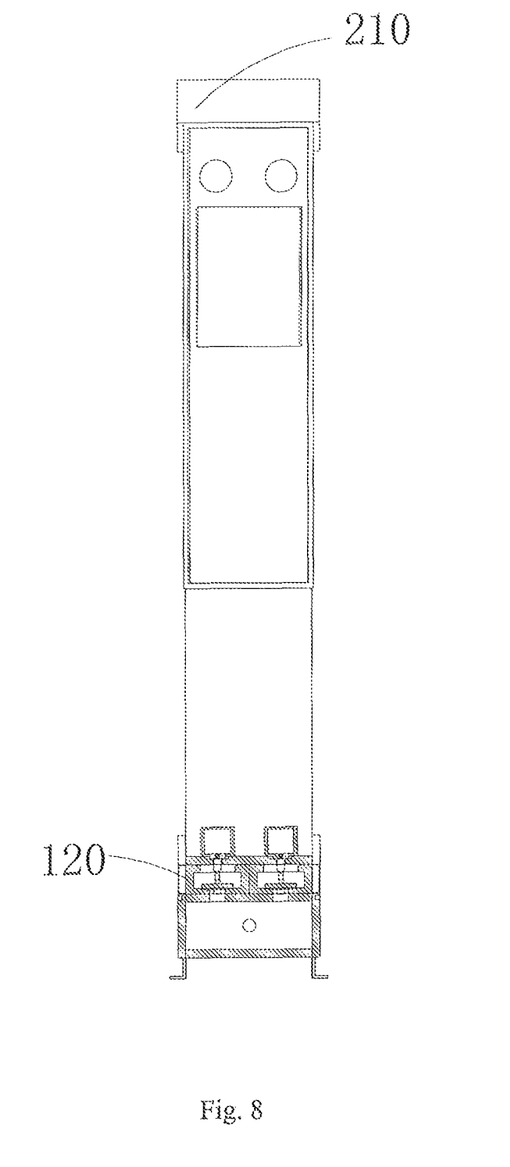
FIG. 8 is another schematic sectional view of the adsorption-separation device according to the embodiment of the present invention.
Figure 9:
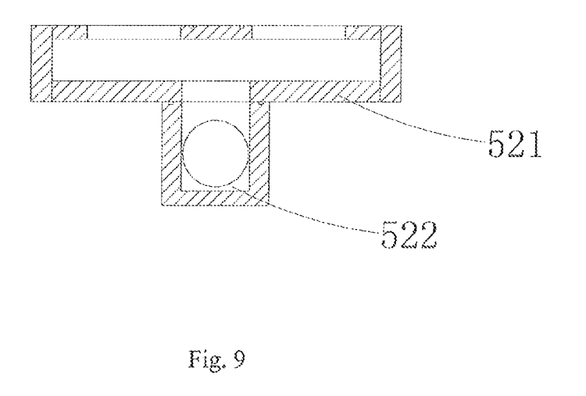
FIG. 9 is a schematic sectional view of an air outlet valve of the adsorption-separation device according to the embodiment of the present invention.
Figure 10:
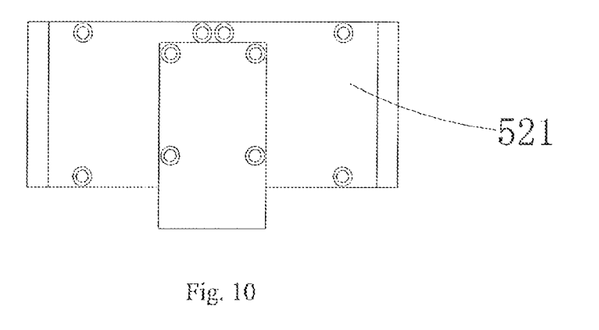
FIG. 10 is a schematic planar top view of the air outlet valve of the adsorption-separation device according to the embodiment of the present invention.
Figure 11:
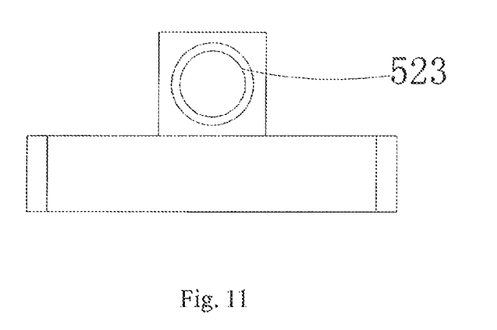
FIG. 11 is a schematic planar front view of the air outlet valve of the adsorption-separation device according to the embodiment of the present invention.
Figure 12:
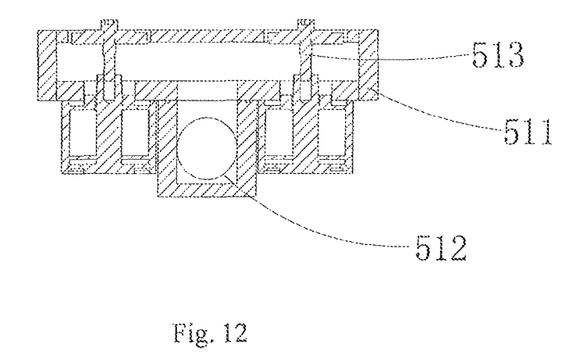
FIG. 12 is a schematic sectional view of the air inlet valve of the adsorption-separation device according to the embodiment of the present invention.
Figure 13:
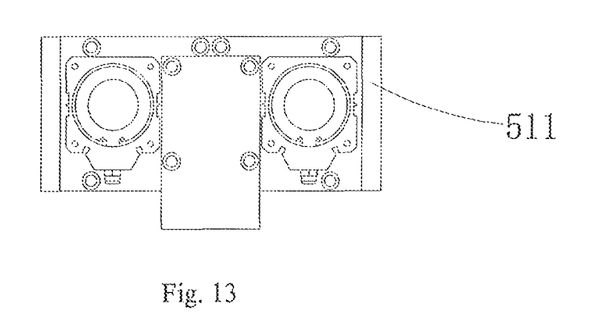
FIG. 13 is a schematic planar top view of the air inlet valve of the adsorption-separation device according to the embodiment of the present invention.
Figure 14:
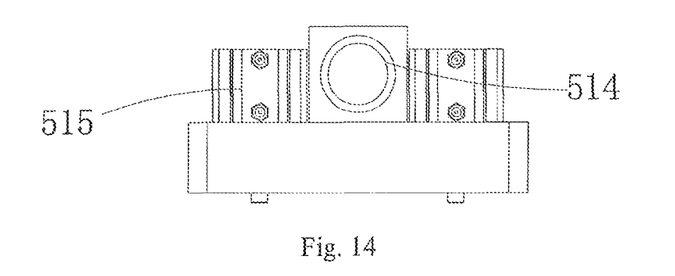
FIG. 14 is a schematic planar front view of the air inlet valve of the adsorption-separation device according to the embodiment of the present invention.
Figure 15:
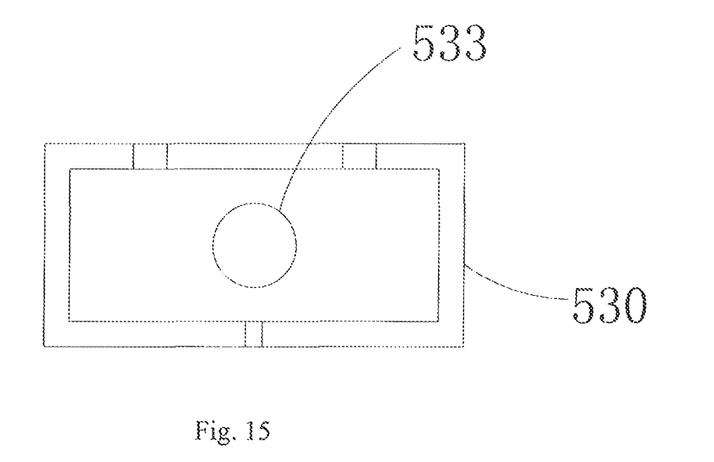
FIG. 15 is a schematic plan front view of an air exhaust silencing valve of the adsorption-separation device according to the embodiment of the present invention.
Figure 16:
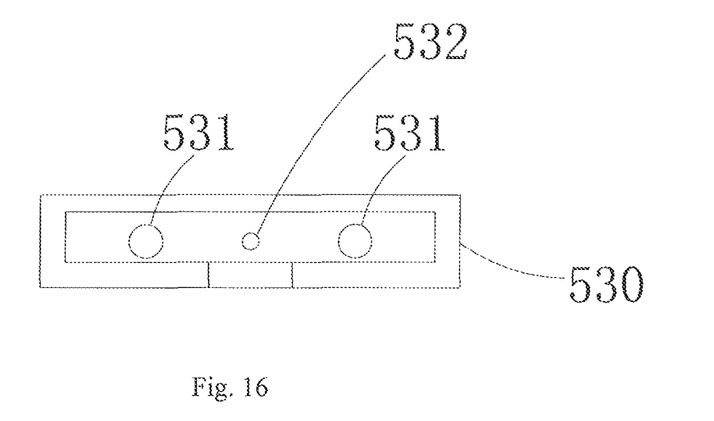
FIG. 16 is a schematic planar top view of an air exhaust silencing valve of the adsorption-separation device according to the embodiment of the present invention.

In particular, as shown in FIG. 3 and FIG. 8, the base component 100 defines annular grooves 102 therein for engaging with the adsorption pipes 300, which are convenient for positioning and replacing the adsorption pipes 300.

In particular, as shown in FIG. 3 and FIG. 8, the top cover component 200 defines recesses 202 therein for engaging with the adsorption pipes 300, the position of the recess 202 corresponds with the position of the annular groove 102, in order to position the adsorption pipe 300 reliably.

In particular, as shown in FIG. 2 and FIG. 4, there are at least two adsorption pipes 300. A limiting plate 230 is arranged around the adsorption pipes 300 for engaging with the limiting plate 230. The limiting plate 230 is provided below the top cover component 200 and at the middle and upper parts of the adsorption pipes 300. The limiting plate 230 is disposed around the outside of all of the adsorption pipes 300 to avoid the incline of every adsorption pipe 300 after the top cover component 200 is removed in order to ensure that the device has a remarkably reliable structure. In the design of the structure, the limiting plate 230 may be connected to the base component 100 by the locking component 400, and the top cover component 200 is detachably connected with the limiting plate 230. When the adsorption pipes 300 need to be replaced, the top cover component 200 is only removed, and then a single adsorption pipe 300 or a plurality of adsorption pipes 300 may be taken out at one time and replaced. The assembly, disassembly and maintenance of the device are convenient, and the efficiency of the maintenance is high. The adsorption materials in the adsorption pipes 300 also may be replaced after the adsorption pipes 300 are removed from the device, and it is easy to be operated.

Figure 6:
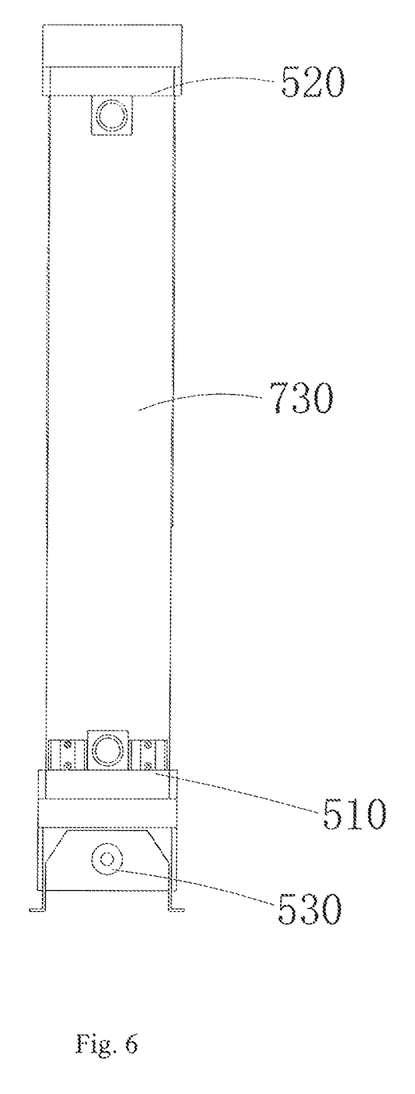
FIG. 6 is a schematic planar rear view of the adsorption-separation device with the distribution box according to the embodiment of the present invention.
Figure 7:
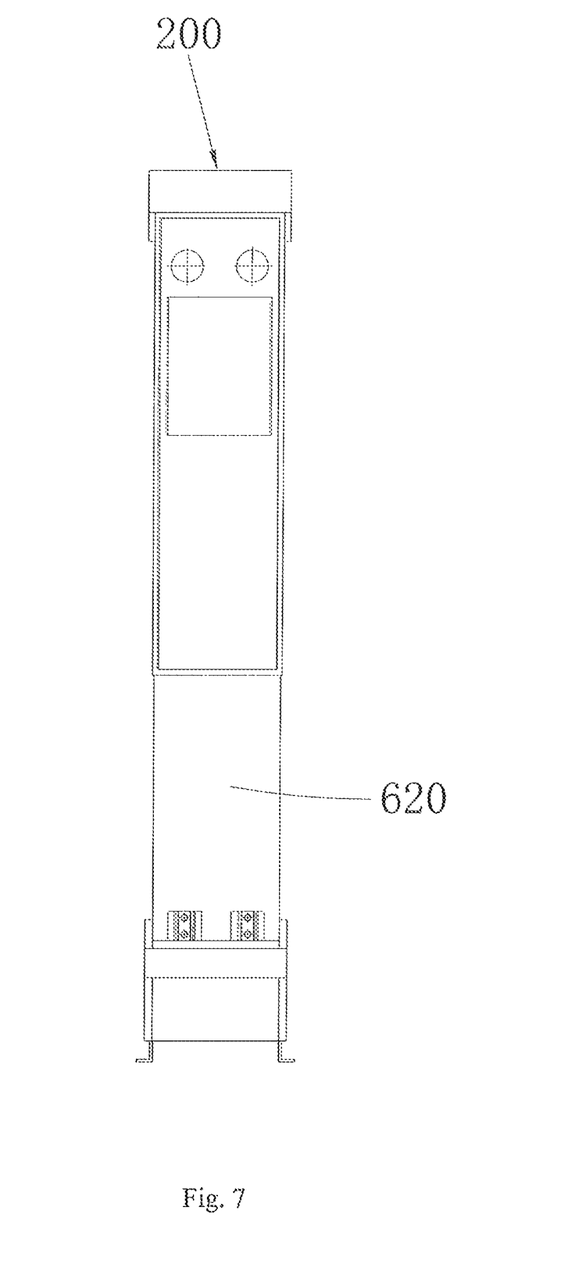
FIG. 7 is a schematic planar front view of an adsorption-separation device with the distribution box according to the embodiment of the present invention.

Furthermore, as shown in FIG. 4, FIG. 6 and FIG. 7, an enclosing plate is provided around the adsorption pipes 300 between the base component 100 and the top cover component 200, the enclosing plate includes two side panels 610, a front panel 620 and a rear panel 630 so as to protect an inner structure of the device and represent aesthetic appearance.

Furthermore, a heater is arranged within the top cover component 200 (not shown) in order to raise the temperature of air and reduce the humidity of the air. Therefore the temperature of the regenerated air flow is raised and the wastage of the regenerated air flow is reduced. The reliably of the device is improved.

Figure 5:
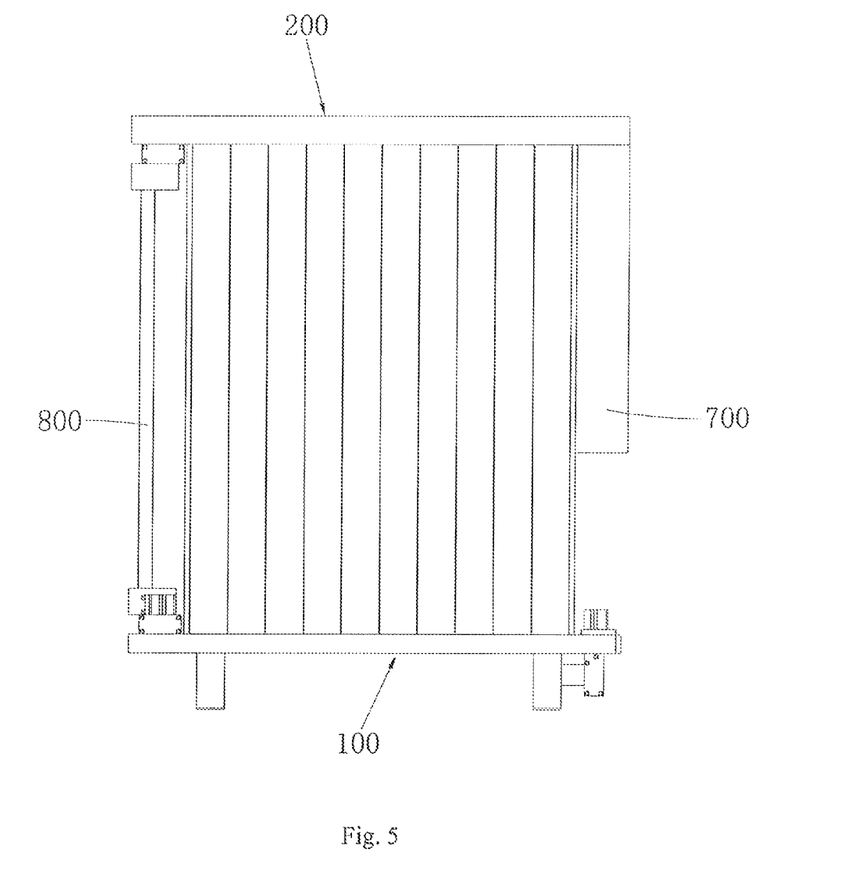
FIG. 5 is a schematic planar side view of the adsorption-separation device with a distribution box according to the embodiment of the present invention.

Furthermore, as shown in FIG. 4 and FIG. 5, the enclosing plate is fixedly provided with a distribution box 700. The distribution box 700 is fixedly arranged on the front panel 620 in order to make the device have compact structure.

In the present invention, an adsorption-separation device is provided, the adsorption pipes 300 are detachably inserted between the base component 100 and the top cover component 200, the base component 100 and the top cover component 200 are connected by the locking component 400 to be convenient for assembly and disassembly. Therefore the adsorption-separation device can be assembled and disassembled quickly, the adsorption pipes 300 can be easily replaced, the low cost maintenance and the stable reliably of the device are achieved.

The present invention has been further detailed in the above descriptions with reference to the preferred embodiments; however, it shall not be construed that implementations of the present invention are only limited to these descriptions. Many simple deductions or replacements may further be made by those of ordinary skill in the art without departing from the conception of the present invention, and all of the deductions or replacements shall be considered to be covered within the protection scope of the present invention.

The invention claimed is:

1. An adsorption-separation device, comprising a base component, a top cover component, and adsorption pipes arranged between the base component and the top cover component, wherein one end of each of the adsorption pipes is detachably connected with the base component, the other end of the adsorption pipe is detachably connected with the top cover component, a locking component used for compressing the adsorption pipes is arranged between the base component and the top cover component, wherein the locking component is extended through the base component and the top cover component, the locking component is a screw bolt.

2. The adsorption-separation device of claim 1, wherein the base component defines annular grooves therein for engaging with the adsorption pipes.

3. The adsorption-separation device of claim 1, wherein the top cover component defines recesses therein for engaging with the adsorption pipes.

4. The adsorption-separation device of claim 1, wherein a limiting plate is arranged around the adsorption pipes for engaging the adsorption pipes with the limiting plate, and the limiting plate is arranged below the top cover component.

5. The adsorption-separation device of claim 1, wherein the base component comprises a base and a lower air pipe arranged between the base and the adsorption pipes, the top cover component comprises a top cover and an upper air pipe arranged between the top cover and the adsorption pipes, one end of each of the adsorption pipes is connected with the lower air pipe, the other end of the adsorption pipe is connected with the upper air pipe, the lower air pipe is connected with an air inlet valve and the upper air pipe is connected with an air outlet valve.

6. The adsorption-separation device of claim 5, wherein the air inlet valve comprises a first valve seat having a first pipe joint holder and air inlets, first controlling valves are provided at the air inlets to open or close the air inlets, a first controlling air cylinder is fixedly arranged at the air outlet valve, the air outlet valve comprises a second valve seat having a second pipe joint holder and air outlets, one-way valves used for opening or closing the air outlets are arranged at the air outlets, an air regeneration valve is arranged on the upper air pipe.

7. The adsorption-separation device of claim 5, wherein the lower air pipes are connected with air exhaust silencing valves, the air exhaust silencing valve comprises a silencer and a second controlling cylinder fixedly arranged on the silencer.

8. The adsorption-separation device of claim 5, wherein a bypass pipe is provided between the air inlet valve and the air outlet valve, a bypass valve is fixedly arranged on the bypass pipe.

9. The adsorption-separation device of claim 8, wherein a heater is fixedly arranged within the top cover component.

* * * * *